June 12, 1928.  R. T. PIERCE  1,673,588
METERING SYSTEM
Filed Aug. 14, 1924
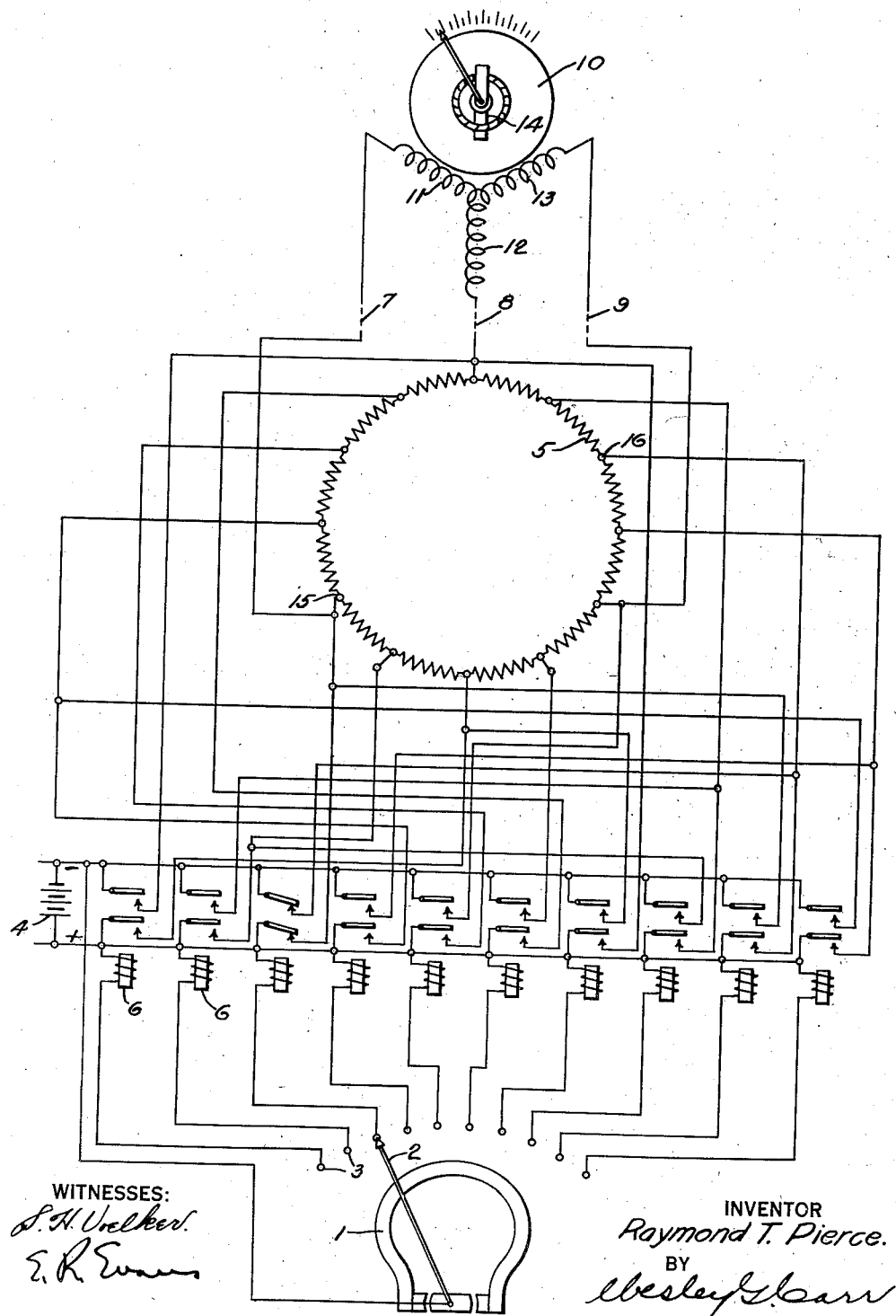
WITNESSES:
S. H. Voelker
E. R. Evans
INVENTOR
Raymond T. Pierce.
BY
Wesley G. Carr
ATTORNEY Patented June 12, 1928.

1,673,588

UNITED STATES PATENT OFFICE.

RAYMOND T. PIERCE, OF EAST PITTSBURGH, PENNSYLVANIA, ASSIGNOR TO WESTINGHOUSE ELECTRIC & MANUFACTURING COMPANY, A CORPORATION OF PENNSYLVANIA.

METERING SYSTEM.

Application filed August 14, 1924. Serial No. 731,911.

My invention relates to metering systems and particularly to systems for transmitting meter indications to distant points.

The object of my invention is to provide an improved remote metering system that, although sensitive, will not be affected by fluctuations of the battery voltage or the resistances of the conductors connecting the originating and receiving stations.

A further object of my invention is to provide a metering system, of the above-mentioned character, in which three conductors are employed to connect the originating and receiving stations, the indications of the meter being transmitted by varying the relative magnitudes of the currents in the three conductors.

In accordance with my invention, a resistance loop is connected at a plurality of points, through contact devices, to a variably adjustable member, such as the movable element of a meter. A change in the adjustment of the meter produces a change in the current through the loop. Three conductors of a connecting circuit are connected at equidistant points on the loop so that the currents in said conductors are dependent upon the adjustment of the meter. At the receiving station, an instrument is provided that is responsive to the relative currents in the conductors of the connecting circuit. Since the changes in the battery voltage and in the resistances of the conductors of the connecting circuit will ordinarily affect all of said conductors equally, it is apparent that no inaccuracy is introduced by reason of fluctuations of said voltage or resistances.

Referring to the accompanying drawings, the single figure thereof is a diagrammatic view of a remote metering system embodying my invention.

A meter 1 is provided with a movable contact member 2 that is adapted to engage stationary contact members 3. Depending upon which contact members are in engagement, a battery 4 is connected at certain points to a resistance loop 5. Relays 6 are interposed between the resistance loop and the meter contact members 3, the relays being operated by the movement of the meter 1 and, in turn, controlling the connection of the battery 4 to the resistance loop 5.

A connecting circuit comprising three conductors 7, 8 and 9 extends to the receiving station. The three conductors 7, 8 and 9 are connected to equidistant points on the resistance loop 5. An instrument 10 at the receiving station is connected to the conductors 7, 8 and 9 and is adapted to be operated in accordance with the relative currents in said conductors in order to provide an indication of the position of the meter 1 at the sending station. As shown, the instrument 10 comprises distributed windings 11, 12 and 13, cooperating with the movable polarized magnet or bar 14. The position of the movable magnet 14 depends upon the relative currents in said windings.

In the position of the meter 1 shown in the drawing, a circuit is closed from battery 4 through the movable contact member 2, the third stationary contact member 3 and the third relay 6. The said relay 6 becomes energized and closes, through its contacts, a circuit from the battery 4 to two opposite points 15 and 16 on the resistance loop 5. The resistance loop 5 is shunted by the circuits comprising the conductors 7, 8 and 9, and therefore, these conductors carry currents depending upon the points at which they are connected to the resistance loop. Accordingly, the coils 11, 12 and 13 of the instrument 10 are energized, and the movable element 14 of the instrument assumes a position corresponding to the energization of said windings.

In case the meter 1 changes position, a different one of the relays 6 becomes energized, thereby moving the connection of the battery to the resistance loop 5 away from the points 15 and 16. The change in the connection of the battery causes a change in the respective currents in the conductors 7, 8 and 9 and this causes a different energization of the windings 11, 12 and 13 of the instrument 10. The instrument 10 thus assumes a different position which corresponds to the different position of the instrument 1. In this manner, the meter reading is transmitted to the receiving station. Since changes in the potential of the battery 4 connected to the resistance loop 5 causes proportionate changes of the currents in the conductors 7, 8 and 9, the accuracy of the transmission is not affected by such changes. Furthermore, if changes in the resistance of the conductors 7, 8 and 9, due to changes of temperature or the like, are equal, the transmission is not affected.

While I have described my invention in connection with a system for transmitting meter indications, it may be used for the transmission of position or any other indication desired. Furthermore, I do not consider that my invention is limited to the precise construction shown and described and, therefore, I do not wish to be limited in scope except by the appended claims.

I claim as my invention:

1. In a remote metering system, the combination of a contact-making meter actuated by the electrical quantity to be measured, a source of electrical energy, relays, and means whereby said relays are successively connected to said source by said meter, with a resistor loop and an electro-magnetically-operated indicator having three windings connected to equidistant points on said loop, each of said relays having two contacts which are closed when the relays are energized, and means whereby said relay contacts connect various sets of diametrically opposite points of said resistor loop to said source of energy.

2. In a system for remotely indicating the magnitude of electrical quantities, the combination of a contact-making meter having a moving contact arm actuated in accordance with the electrical quantity to be measured, and a series of fixed contacts adapted to be engaged by said moving contact, a source of electrical energy, relays and means whereby the relays are connected successively to said source by the engagement of the said moving contacts with said fixed contacts, with a resistor loop and an electro-magnetically-operated indicator connected to three equidistant points thereof, each of said relays having two contacts which are closed when the relays are connected to the energy source, and means whereby said relay contacts connect various sets of diametrically opposite points of said loop to said source of energy.

In testimony whereof, I have hereunto subscribed my name this 2nd day of August, 1924.

RAYMOND T. PIERCE.